United States Patent [19]

Uekusa et al.

[11] Patent Number: 5,387,360
[45] Date of Patent: Feb. 7, 1995

[54] ENGINE ANTIFREEZE COOLANT COMPOSITION

[75] Inventors: Hideharu Uekusa; Kouzou Matsuzaki, both of Ichihara, Japan

[73] Assignee: Ethylene Chemical Co., Ltd., Chiba, Japan

[21] Appl. No.: 132,042

[22] Filed: Oct. 5, 1993

[30] Foreign Application Priority Data

Oct. 7, 1992 [JP] Japan ............................. 4-291952

[51] Int. Cl.$^6$ ............................................. C09K 5/00
[52] U.S. Cl. .......................................... 252/73; 106/13; 252/74; 252/75; 252/76; 252/77; 252/78.1; 252/79
[58] Field of Search ................... 106/13; 252/70, 73, 252/74, 75, 76, 78.1, 79, 77

[56] References Cited

U.S. PATENT DOCUMENTS

| | | | |
|---|---|---|---|
| 4,382,870 | 5/1983 | Abel et al. | 252/75 |
| 4,389,371 | 6/1983 | Wilson et al. | 252/76 |
| 4,390,439 | 6/1983 | Schwartz et al. | 252/75 |
| 4,450,088 | 5/1984 | Wilson et al. | 252/75 |
| 4,452,758 | 6/1984 | Wilson et al. | 252/75 |
| 4,455,248 | 6/1984 | Wood | 252/75 |
| 4,528,108 | 7/1985 | Grover | 252/75 |
| 4,587,028 | 5/1986 | Darden | 252/75 |
| 4,810,404 | 3/1989 | Gousetis et al. | 252/75 |
| 4,851,145 | 7/1989 | Van Neste et al. | 252/76 |

FOREIGN PATENT DOCUMENTS

| | | | |
|---|---|---|---|
| 3832592 | 3/1990 | Germany | 252/76 |
| 3841062 | 6/1990 | Germany | 252/76 |
| 45-036574 | 11/1970 | Japan | 252/76 |
| 62-089788 | 4/1987 | Japan | 252/76 |
| 89040916 | 9/1989 | Japan . | |
| 90014385 | 4/1990 | Japan . | |
| 90028625 | 6/1990 | Japan . | |
| 91001355 | 1/1991 | Japan . | |
| 91056272 | 8/1991 | Japan . | |
| 92014193 | 3/1992 | Japan . | |
| 4117481 | 4/1992 | Japan | 252/76 |
| 2036062 | 6/1980 | United Kingdom | 252/76 |

*Primary Examiner*—Anthony Green
*Attorney, Agent, or Firm*—Ostrolenk, Faber, Gerb & Soffen

[57] ABSTRACT

An engine antifreeze coolant composition comprising a major amount of glycols as the main constituent which contains at least one conventional corrosion inhibitor except silicates, and about 0.005 to about 0.5% by weight of citric acid and/or salts thereof as an essential constituent. The compositions are pollution-free and nontoxic, and have a good corrosion-preventing effect on metallic materials such as aluminum alloys for use in internal combustion engines.

4 Claims, No Drawings

ENGINE ANTIFREEZE COOLANT COMPOSITION

BACKGROUND OF THE INVENTION

1. Field of the Invention

This invention relates to an engine antifreeze coolant composition, and more particularly to an engine antifreeze coolant composition which has a good corrosion-preventing effect on metallic materials such as aluminum alloys for use in internal combustion engines.

2. Background Art

Metallic materials such as aluminum alloys, copper, and copper alloys are widely used for the manufacture of engine blocks, cylinder heads, radiators, and water pumps. A disadvantage for these metallic materials is the lack of corrosion resistance to corrosive salts-containing water contained in engine cooling liquid, or to alcohols present in engine antifreeze coolants; therefore, there is a need for incorporating various corrosion inhibitors in the foregoing engine antifreeze coolants.

Typical examples of the corrosion inhibitor which can be employed in conventional engine antifreeze coolants include those as specified in BS (British Standard) 3150, BS 3151, and BS 3152. Both triethanolamine phosphate and mercaptobenzothiazole sodium salt, both sodium benzoate and sodium nitrite, and borax are incorporated as a corrosion inhibitor into the antifreeze coolant comprising ethylene glycol as the main constituent in BS 3150, BS 3151, and BS 3152 respectively. However, when these corrosion inhibitors are incorporated individually in an antifreeze coolant, the resulting antifreeze coolant does not exert a satisfactory corrosion-preventing effect on metallic materials for use in the foregoing engine cooling mechanism; therefore, several methods have been proposed in literature (see, for example, Japanese Patent Publication Nos. 40916 of 1989, 14385 of 1990, 28625 of 1990, 1355 of 1991, 56272 of 1991 and 14193 of 1992), wherein the use of a new blend of the foregoing inhibitors, or the use of an additional new corrosion inhibitor selected from among amine salts, silicates, and divalent metal compounds including magnesium, calcium or zinc compounds has been proposed.

A problem associated with the use of an amine salt as a corrosion inhibitor is formation of toxic nitrosamine when the amine salt is combined with a nitrite in a coolant. Disadvantages for the use of a silicate as a corrosion inhibitor are as follows: a) silicates are poor in thermal stability in nature, b) the incorporation of a silicate makes an antifreeze coolant unstable to pH, and c) gel generates with ease in a coolant when a silicate is incorporated into a coolant which contains other salts, causing the inherent corrosion-preventing effect of the coolant to decrease.

Further, when used in the presence of a phosphate and fatty acid salt, a divalent metal compound as a corrosion inhibitor interacts readily with these salts, causing the salts to precipitate and decreasing the corrosion-preventing effect of the coolant. Thus, combined use of these corrosion inhibitors with other inhibitors exert a harmful influence.

SUMMARY OF THE INVENTION

It is the object of the present invention to provide a pollution-free and nontoxic antifreeze coolant composition which has a good corrosion-preventing effect on metallic materials such as aluminum alloys for use in internal combustion engines.

After intensive investigations, the applicants have found that the intended object can be attained by incorporating a specific amount of citric acid and/or salts thereof into an antifreeze coolant comprising glycols as the main constituent which contains at least one conventional corrosion inhibitor except silicates. The present invention has been completed on the basis of this finding.

That is, a first aspect of the invention is directed to an antifreeze coolant composition comprising a major amount of glycols as the main constituent, at least one corrosion inhibitor except silicates, and about 0.005 to about 0.5% by weight of citric acid and/or salts thereof as an essential constituent.

A second aspect of the invention is directed to an antifreeze coolant composition according to the first aspect, wherein the corrosion inhibitor is at least one selected from the group consisting of phosphates, amine salts, borates, nitrates, nitrites, molybdates, tungstates, benzoates, triazoles, thiazoles, and fatty acid salts.

DETAILED DESCRIPTION OF THE PREFERRED EMBODIMENTS

Examples of the glycol used in the present invention include ethylene glycol, propylene glycol, 1,3-butylene glycol, hexylene glycol, diethylene glycol, and glycerin, with the preferred glycol being ethylene glycol and propylene glycol.

The corrosion inhibitors which can be used in the invention are those except silicates. Silicates are generally poor in thermal stability in nature. The incorporation of a silicate makes an antifreeze coolant unstable to pH. In addition, gel generates in a coolant when a silicate is incorporated into the coolant which contains other salts, causing the corrosion-preventing effect of the coolant to decrease.

Examples of the corrosion inhibitor suitable for use in the antifreeze coolant composition according to the invention include phosphates, amine salts, borates, nitrates, nitrites, molybdates, tungstates, benzoates, triazoles, thiazoles, fatty acid salts, and mixtures thereof.

Typical examples of the corrosion inhibitor include conventional inhibitors such as orthophosphoric acid, octanoic acid, sebacic acid, para-tert.-butyl benzoate, sodium benzoate, sodium molybdate, mercaptobenzothiazole sodium salt, benzotriazole, tolyltriazole, sodium nitrate, sodium nitrite, borax, triethanolamine, and potassium hydroxide.

In addition to the foregoing inhibitor, the antifreeze coolant composition of the invention contains citric acid and/or salts thereof as an essential constituent in an amount of from about 0.005 to about 0.5% by weight, preferably from about 0.03 to about 0.1% by weight, more preferably from about 0.04 to about 0.06% by weight.

When an organic acid other than citric acid and salts thereof, a tribasic acid, or a di-basic acid is employed in place of citric acid, the resulting coolant has little corrosion-preventing effect, whether the organic acid has a hydroxyl group in the molecule or not.

When the amount of citric acid and/or salts thereof in an antifreeze coolant composition is less than about 0.005% by weight, the resulting coolant does not exert a satisfactory corrosion-preventing effect on metallic materials such as aluminum alloys, resulting in an increase in weight loss of metallic materials due to corrosion, and the appearance of the surface state of metallic materials turning black unpreferably. Inversely, when it is more than about 0.5% by weight, the resulting coolant does not exert a desirable-corrosion-preventing effect either, resulting in an increase in the weight loss of cast aluminum test pieces due to corrosion, and the appearance of the surface state of cast aluminum alloy test pieces turning black unpreferably.

In the engine antifreeze coolant compositions according to the present invention, other optional additives such as antifoamers, dyestuffs, and bitters may be employed, in so far as they do not deviate from the gist of the invention.

As described above, when a specific amount of citric acid and/or salts thereof is incorporated into an antifreeze coolant comprising a major amount of glycols as the main constituent which contains at least one conventional corrosion inhibitor except silicates, an antifreeze coolant having a good corrosion-preventing effect on metallic materials such as aluminum alloys for use in internal combustion engines can be obtained. On the other hand, when an organic acid other than citric acid and salts thereof, a tribasic organic acid, or a dibasic organic acid is employed in place of citric acid and/or salts thereof, the resulting coolant has little corrosion-preventing effect on metallic materials such as aluminum alloys, whether the organic acid has a hydroxyl group in the molecule or not.

Although the reason for this has not been proven, it is possibly true that synergism and interaction between corrosion inhibitors, glycols and citric acid and/or salts thereof contribute much to the foregoing good corrosion-preventing effect of the antifreeze coolant compositions of the invention. The synergic effect cannot be achieved by employing the individual constituents.

EXAMPLES

While the advantages of the compositions according to the present invention will be described in detail hereinbelow in conjunction with the following examples, it is noted that the scope of the invention should not be limited to these examples.

Examples 1 to 8

Antifreeze coolants according to the present invention were prepared. Table 1 sets forth the formulas. The effectiveness of the coolants for preventing corrosion of aluminum alloy under heat-transfer conditions was evaluated in accordance with the test method prescribed by ASTM D 4340-84 (Corrosion of Cast Aluminum Alloys in Engine Coolants under Heat Rejecting Conditions), and the metal corrosion property was evaluated in accordance with the test method as provided by JIS K 2234-1987 (Engine Antifreeze, 7.4 Metal Corrosive Property Test).

Table 2 and 3 show the test items, testing conditions and requirements specified in the foregoing ASTM and JIS standards, respectively. Tables 4 to 5 show a summary of the test results.

TABLE 1

|  | Examples | | | | | | | |
| --- | --- | --- | --- | --- | --- | --- | --- | --- |
|  | 1 | 2 | 3 | 4 | 5 | 6 | 7 | 8 |
| Citric acid | 0.005 | 0.02 | — | — | 0.30 | — | 0.50 | 0.05 |
| Sodium citrate | — | — | 0.10 | — | — | 0.30 | — | — |
| Ammonium citrate | — | — | — | 0.20 | — | — | — | — |
| Sodium benzoate | — | 6.0 | — | 3.0 | 2.0 | 2.0 | 3.0 | 2.0 |
| p-tert.-butyl benzoate | 3.0 | — | — | — | 2.0 | — | 1.0 | 2.0 |
| Octanic acid | 3.0 | — | — | — | — | 2.0 | — | — |
| Sebacic acid | — | — | — | — | — | — | 1.0 | — |
| 75% phosphoric acid | 0.4 | — | 0.7 | 0.4 | 0.8 | 0.6 | 0.5 | 0.4 |
| Sodium nitrite | — | — | — | — | — | — | 0.5 | — |
| Sodium nitrate | 0.5 | — | 0.3 | 0.5 | 0.5 | 0.3 | 0.5 | 0.5 |
| Sodium molybdate.2H$_2$O | — | — | — | — | 0.1 | — | — | — |
| Sodium tetraborate.10H$_2$O | — | — | — | 3.0 | — | — | — | — |
| Benzotriazole | 0.3 | — | — | 0.3 | 0.3 | — | 0.3 | 0.1 |
| Tryltriazole | — | 0.2 | — | — | — | 0.2 | — | 0.1 |
| Mercaptobenzothiazole. Na salt | 0.3 | — | 0.3 | 0.3 | 0.1 | 0.1 | — | 0.3 |
| Triethanolamine | — | — | 3.6 | — | — | — | — | — |
| Potassium hydroxide | 1.5 | — | 0.5 | 0.6 | 1.6 | 1.0 | 2.2 | 1.2 |
| Water | 2.0 | 2.0 | 2.0 | 2.0 | 2.0 | 2.0 | 2.0 | 2.0 |
| Ethylene glycol | 88.984 | 91.769 | 92.489 | 89.689 | 90.289 | 91.489 | 88.989 | — |
| Propylene glycol | — | — | — | — | — | — | — | 91.339 |
| Dyestuff | 0.01 | 0.01 | 0.01 | 0.01 | 0.01 | 0.01 | 0.01 | 0.01 |
| Antifoamer | 0.001 | 0.001 | 0.001 | 0.001 | 0.001 | 0.001 | 0.001 | 0.001 |
| pH (30 vol %) | 7.9 | 7.6 | 8.9 | 8.2 | 8.3 | 7.9 | 7.6 | 8.2 |

TABLE 2-1

| Outline of ASTM D 4340 Test Method | |
| --- | --- |
| Items | Testing conditions |
| Concentration of antifreeze coolant (%) | 25 |
| Test piece | Aluminum alloy casting |
| Temperature of test piece (°C.) | 135 |
| Amount of test solution (ml) | 500 |
| Operation hours (hr.) | 168 |
| Chloride ion content in test solution (mg/l) | 100 |
| Pressure (kPa) | 193 |

TABLE 2-2

| Requirement specified by ASTM D 4340 Test Method | |
| --- | --- |
| Item | Requirement |
| Change of mass (mg/cm$^2$) | ±1.0 max. |

TABLE 3-1

Outline of JIS K 2234 Metal Corrosive Property Test Method For Engine Antifreeze

| Items | Testing Conditions |
|---|---|
| Concentration of antifreeze coolant (%) | 30 |
| Temperature of test solution (°C.) | 88 |
| Amount of test solution (ml) | 750 |
| Operation hours (hr.) | 336 |
| Blowing dry air (ml/min) | 100 |
| Metal test piece | Five kinds |

TABLE 3-2

Requirements specified by JIS K 2234
(Engine Antifreeze Coolants, Metal Corrosion Property Test)

| | | Requirements | |
|---|---|---|---|
| Items | | Class 1 | Class 2 |
| Change of mass $(mg/cm^2)$ | Aluminum casting | ±0.60 | ±0.30 |
| | Cast iron | ±0.60 | ±0.30 |
| | Steel | ±0.30 | ±0.15 |
| | Brass | ±0.30 | ±0.15 |
| | Solder | ±0.60 | ±0.30 |
| | Copper | ±0.30 | ±0.15 |
| | Appearance | There shall be no visually noticeable corrosion on the test piece, excluding the part contacting with spacer, but change in color is permissible. | |
| | Foaming property during operation | No foam flooding out of the cooler. | |
| Properties of the solution after test | pH value | 6.5–11.0 | |
| | Change of pH | ±1.0 | |
| | Change of reserved alkalinity (%) | to be reported | |
| | Liquid phase | No significant change of color. No significant change of liquor such as separation, generation of gel. | |
| | Amount of precipitation (vol %) | 0.5 max. | |

TABLE 4

Test Results (ASTM D 4340 Test Method)

| Examples | Appearance of metal test piece after test | Change of mass $(mg/cm^2)$ |
|---|---|---|
| 1 | No visually noticeable corrosion | −0.87 |
| 2 | No visually noticeable corrosion | −0.46 |
| 3 | No visually noticeable corrosion | −0.38 |
| 4 | No visually noticeable corrosion | −0.22 |
| 5 | No visually noticeable corrosion | −0.18 |
| 6 | No visually noticeable corrosion | −0.16 |
| 7 | No visually noticeable corrosion | −0.14 |
| 8 | No visually noticeable corrosion | −0.23 |

TABLE 5

| | | Examples | | | | | | | |
|---|---|---|---|---|---|---|---|---|---|
| | | 1 | 2 | 3 | 4 | 5 | 6 | 7 | 8 |
| Appearance of test piece | | Accepted | Accepted | Accepted | Accepted | Accepted | Accepted | Accepted | Accepted |
| Change of mass $(mg/cm^2)$ | Aluminum casting | −0.02 | −0.08 | −0.02 | 0.00 | −0.06 | 0.02 | −0.03 | −0.02 |
| | Cast iron | 0.00 | 0.02 | 0.00 | 0.02 | 0.00 | 0.03 | 0.03 | 0.02 |
| | Steel | 0.00 | −0.01 | 0.01 | 0.00 | −0.01 | 0.00 | 0.02 | 0.00 |
| | Brass | −0.03 | −0.02 | −0.03 | −0.02 | −0.03 | −0.04 | −0.03 | −0.03 |
| | Solder | 0.02 | 0.00 | 0.02 | 0.03 | 0.02 | −0.01 | 0.03 | 0.00 |
| | Copper | −0.04 | −0.03 | −0.04 | −0.03 | −0.05 | −0.06 | −0.04 | −0.04 |
| Appearance of solution | | Accepted | Accepted | Accepted | Accepted | Accepted | Accepted | Accepted | Accepted |
| Change of pH | | −0.1 | 0.4 | 0.2 | 0.1 | 0.3 | 0.2 | 0.5 | 0.4 |

Comparative Examples 1 to 18

By way of comparison, antifreeze coolants were prepared in accordance with the formulas Given in Tables 6 to 7. The samples thus prepared, were then tested in the same way as in Examples above. Tables 8 to 10 summarize the test results.

TABLE 6

| | Comparative Examples | | | | | | | | | |
|---|---|---|---|---|---|---|---|---|---|---|
| | 1 | 2 | 3 | 4 | 5 | 6 | 7 | 8 | 9 | 10 |
| Citric acid | — | 0.001 | 1.0 | — | — | — | — | — | — | — |
| Sodium benzoate | — | — | — | 6.0 | — | 3.0 | 2.0 | 2.0 | 3.0 | — |
| p-tert.-butyl benzoate | 3.0 | 3.0 | 3.0 | — | — | — | 2.0 | — | 1.0 | 3.0 |
| Octanic acid | 3.0 | 3.0 | 3.0 | — | — | — | — | 2.0 | — | 3.0 |
| Sebacic acid | — | — | — | — | — | — | — | — | 1.0 | — |
| 75% phosphoric acid | 0.4 | 0.4 | 0.4 | — | 0.7 | 0.4 | 0.8 | 0.6 | 0.5 | 0.4 |
| Sodium nitrite | — | — | — | — | — | — | — | — | 0.5 | — |

TABLE 6-continued

|  | Comparative Examples | | | | | | | | | |
|---|---|---|---|---|---|---|---|---|---|---|
|  | 1 | 2 | 3 | 4 | 5 | 6 | 7 | 8 | 9 | 10 |
| Sodium nitrate | 0.5 | 0.5 | 0.5 | — | 0.3 | 0.5 | 0.5 | 0.3 | 0.5 | 0.55 |
| Sodium molybdate | — | — | — | — | — | — | 0.1 | — | — | — |
| Sodium tetraborate.10H$_2$O | — | — | — | — | — | 3.0 | — | — | — | — |
| Benzotriazole | 0.3 | 0.3 | 0.3 | — | — | 0.3 | 0.3 | — | 0.3 | 0.3 |
| Tryltriazole | — | — | — | 0.2 | — | — | — | 0.2 | — | — |
| Mercaptobenzothiazole.Na salt | 0.3 | 0.3 | 0.3 | — | 0.3 | 0.3 | 0.1 | 0.1 | — | 0.3 |
| Triethanol amine | — | — | — | — | 3.6 | — | — | — | — | — |
| Potassium hydroxide | 1.5 | 1.5 | 1.7 | — | 0.5 | 0.6 | 1.6 | 1.0 | 2.2 | 1.5 |
| Water | 2.0 | 2.0 | 2.0 | 2.0 | 2.0 | 2.0 | 2.0 | 2.0 | 2.0 | 2.0 |
| Ethylene glycol | 88.989 | 88.988 | 87.789 | 91.789 | 92.589 | 89.889 | 90.589 | 91.789 | 87.989 | 88.789 |
| Dyestuff | 0.01 | 0.01 | 0.01 | 0.01 | 0.01 | 0.01 | 0.01 | 0.01 | 0.01 | 0.01 |
| Antifoamer | 0.001 | 0.001 | 0.001 | 0.001 | 0.001 | 0.001 | 0.001 | 0.001 | 0.001 | 0.001 |
| Tartaric acid | — | — | — | — | — | — | — | — | — | 0.2 |
| pH (30 vol %) | 7.9 | 7.9 | 7.9 | 7.6 | 8.9 | 8.2 | 8.3 | 7.9 | 7.6 | 7.9 |

TABLE 7

|  | Comparative Examples | | | | | | | | | |
|---|---|---|---|---|---|---|---|---|---|---|
|  | 11 | 12 | 13 | 14 | 15 | 16 | 17 | 18 | 19 | 20 |
| Citric acid | — | — | — | — | — | — | — | — | — | — |
| Sodium benzoate | — | — | — | — | — | — | — | — | 3.0 | 4.2 |
| p-tert.-butyl benzoate | 3.0 | 3.0 | 3.0 | 3.0 | 3.0 | 3.0 | 3.0 | 3.0 | 0.5 | — |
| Octanic acid | 3.0 | 3.0 | 3.0 | 3.0 | 3.0 | 3.0 | 3.0 | 3.0 | 0.5 | — |
| Sebacic acid | — | — | — | — | — | — | — | — | — | 1.5 |
| 75% phosphoric acid | 0.4 | 0.4 | 0.4 | 0.4 | 0.4 | 0.4 | 0.4 | 0.4 | — | — |
| Sodium nitrite | — | — | — | — | — | — | — | — | — | — |
| Sodium nitrate | 0.5 | 0.5 | 0.5 | 0.5 | 0.5 | 0.5 | 0.5 | 0.5 | 0.2 | — |
| Sodium molybdate | — | — | — | — | — | — | — | — | — | — |
| Sodium tetraborate.10H$_2$O | — | — | — | — | — | — | — | — | 3.0 | — |
| Sodium silicate.9H$_2$O | — | — | — | — | — | — | — | — | 0.15 | 0.3 |
| Benzotriazole | 0.3 | 0.3 | 0.3 | 0.3 | 0.3 | 0.3 | 0.3 | 0.3 | 0.2 | 0.05 |
| Tryltriazole | — | — | — | — | — | — | — | — | 0.1 | 0.15 |
| Marcaptobenzothiazole.Na salt | 0.3 | 0.3 | 0.3 | 0.3 | 0.3 | 0.3 | 0.3 | 0.3 | 0.1 | — |
| Triethanol amine | — | — | — | — | — | — | — | — | — | — |
| Potassium hydroxide | 1.5 | 1.5 | 1.5 | 1.5 | 1.5 | 1.5 | 1.5 | 1.5 | 1.0 | 2.0 |
| Water | 2.0 | 2.0 | 2.0 | 2.0 | 2.0 | 2.0 | 2.0 | 2.0 | 2.0 | 2.0 |
| Ethylene glycol | 88.789 | 88.789 | 88.789 | 88.789 | 88.789 | 88.789 | 88.789 | 88.789 | 89.237 | 89.789 |
| Dyestuff | 0.01 | 0.01 | 0.01 | 0.01 | 0.01 | 0.01 | 0.01 | 0.01 | 0.01 | 0.01 |
| Antifoamer | 0.001 | 0.001 | 0.001 | 0.001 | 0.001 | 0.001 | 0.001 | 0.001 | 0.001 | 0.001 |
| Bitters (BITREX ™) | — | — | — | — | — | — | — | — | 0.002 | — |
| Tartaric acid | — | — | — | — | — | — | — | — | — | — |
| Aconitic acid | 0.2 | — | — | — | — | — | — | — | — | — |
| Tricarballytic acid | — | 0.2 | — | — | — | — | — | — | — | — |
| Malic acid | — | — | 0.2 | — | — | — | — | — | — | — |
| Lactic acid | — | — | — | 0.2 | — | — | — | — | — | — |
| Salicylic acid | — | — | — | — | 0.2 | — | — | — | — | — |
| Gallic acid | — | — | — | — | — | 0.2 | — | — | — | — |
| Dodecanoic-2-acid | — | — | — | — | — | — | 0.2 | — | — | — |
| Adipic acid | — | — | — | — | — | — | — | 0.2 | — | — |
| pH (30 vol %) | 7.9 | 7.9 | 7.9 | 7.9 | 7.9 | 7.9 | 7.9 | 7.9 | 8.5 | 9.2 |

TABLE 8

Test Results (ASTM D 4340 Test Method)

| Comparative Examples | Appearance of metal test piece after test | Change of mass (mg/cm$^2$) |
|---|---|---|
| 1 | Turned black | −1.22 |
| 2 | Turned black | −1.43 |
| 3 | No significant change of color | −0.21 |
| 4 | Turned black | −1.78 |
| 5 | Turned black | −1.32 |
| 6 | Turned black | −2.48 |
| 7 | Turned black | −1.52 |
| 8 | Turned black | −1.73 |
| 9 | Turned black | −2.33 |
| 10 | Turned black | −1.35 |
| 11 | Turned black | −1.47 |
| 12 | Turned black | −1.36 |
| 13 | Turned black | −1.52 |
| 14 | Turned black | −1.62 |
| 15 | Turned black | −1.38 |
| 16 | Turned black | −1.32 |
| 17 | Turned black | −1.56 |
| 18 | Turned black | −1.54 |
| 19 | No visually noticeable corrosion | −0.47 |
| 20 | No visually noticeable corrosion | −0.28 |

TABLE 9

| | | Comparative Examples | | | | | | | | | |
|---|---|---|---|---|---|---|---|---|---|---|---|
| | | 1 | 2 | 3 | 4 | 5 | 6 | 7 | 8 | 9 | 10 |
| Appearance of test piece | | Accepted | Accepted | Rejected | Accepted | Accepted | Accepted | Accepted | Accepted | Accepted | Accepted |
| Change of mass ($mg/cm^2$) | Aluminum casting | −0.08 | −0.06 | −0.36 | −0.12 | −0.10 | −0.08 | −0.12 | −0.08 | −0.09 | −0.06 |
| | Cast iron | 0.03 | 0.00 | −0.98 | 0.02 | 0.00 | 0.02 | 0.00 | 0.02 | 0.02 | 0.03 |
| | Steel | 0.00 | 0.00 | −0.12 | −0.01 | 0.01 | 0.00 | −0.01 | 0.00 | 0.02 | 0.00 |
| | Brass | −0.03 | −0.03 | −0.03 | −0.02 | −0.03 | −0.02 | −0.03 | −0.04 | −0.03 | −0.04 |
| | Solder | 0.00 | −0.02 | −0.01 | 0.00 | 0.02 | −0.03 | −0.02 | −0.01 | −0.03 | −0.02 |
| | Copper | −0.05 | −0.04 | −0.04 | −0.03 | −0.04 | −0.03 | −0.05 | −0.06 | −0.04 | −0.05 |
| Appearance of solution | | Accepted | Accepted | Accepted | Accepted | Accepted | Accepted | Accepted | Accepted | Accepted | Accepted |
| Change of pH | | 0.8 | 1.5 | 0.5 | 0.3 | 0.2 | 0.3 | 0.4 | 0.5 | 0.7 | 0.8 |

TABLE 10

| | | Comparative Examples | | | | | | | | | |
|---|---|---|---|---|---|---|---|---|---|---|---|
| | | 11 | 12 | 13 | 14 | 15 | 16 | 17 | 18 | 19 | 20 |
| Appearance of test piece | | Accepted | Accepted | Accepted | Accepted | Accepted | Accepted | Accepted | Accepted | Accepted | Accepted |
| Change of mass ($mg/cm^2$) | Aluminum casting | −0.05 | −0.03 | −0.05 | −0.04 | −0.07 | −0.09 | −0.03 | −0.06 | −0.02 | 0.00 |
| | Cast iron | 0.02 | 0.02 | 0.03 | 0.04 | 0.02 | 0.04 | 0.03 | 0.02 | 0.02 | 0.01 |
| | Steel | 0.03 | 0.00 | 0.01 | 0.03 | 0.02 | 0.00 | 0.01 | −0.04 | 0.00 | 0.01 |
| | Brass | −0.02 | −0.03 | −0.02 | −0.02 | −0.05 | −0.06 | −0.07 | −0.05 | −0.03 | −0.04 |
| | Solder | −0.04 | −0.02 | −0.03 | −0.03 | −0.02 | −0.05 | −0.06 | −0.07 | 0.02 | 0.00 |
| | Copper | −0.03 | −0.01 | −0.04 | −0.07 | −0.07 | −0.09 | −0.08 | −0.07 | −0.05 | −0.04 |
| Appearance of solution | | Accepted | Accepted | Accepted | Accepted | Accepted | Accepted | Accepted | Accepted | Accepted | Generation of Gel |
| Change of pH | | 0.5 | 0.4 | 0.9 | 0.9 | 1.2 | 1.3 | 0.4 | 0.4 | −0.2 | −0.6 |

In Comparative Examples 1 to 2, and 4 to 18, all of the sample coolants produced aluminum heat-transfer corrosion rates greater than the requirement 1.0 $mg/cm^2$/week and were rejected when tested by applying the method prescribed by the ASTM standards.

In comparative Example 3, although the sample coolant was accepted when tested for its aluminum heat-transfer corrosion rate by the ASTM method, the coolant was rejected when tested for the appearance of the surface state and for the weight change of test pieces by applying the JIS method (Metal Corrosion Property Test).

When the amount of citric acid was below approximately 0.005% by weight (for example, 0.001% by weight in Comparative Example 2), the sample coolants produced aluminum heat-transfer corrosion rates greater than the requirement 1.0 $mg/cm^2$/week (for example, 1.43 $mg/cm^2$/week in Comparative Example 2), and the appearance of the surface state of the test pieces turned black unpreferably.

Inversely, when the amount of citric acid was over approximately 0.5% by weight (for example, 1.0% by weight in Comparative Example 3), sample coolants produced weight changes of aluminum casting test pieces greater than the requirement −0.30 $mg/cm^2$/week (for example, −0.36 $mg/cm^2$/week in Comparative Example 3), and the appearance of the surface state of the aluminum casting test pieces turned black when tested by applying the JIS method (Metal Corrosion Property Test).

Further, when an organic acid other than citric acid, a tribasic organic acid, or a di-basic organic acid was employed in place of citric acid and/or salts thereof, all of the sample coolants (Comparative Examples 10 to 18) produced aluminum heat-transfer corrosion rates greater than the requirement 1.0 $mg/cm^2$/week when tested by applying the ASTM method.

In Comparative Example 19, the sample coolant was accepted when tested by both ASTM and JIS methods for the metal corrosion property, but gel generated in the sample coolant upon standing for about 30 days. It has been shown that the coolant composition is not suitable for use.

In Comparative Example 20, although the sample coolant was not rejected when tested by applying the ASTM method for the items including the appearance of the surface state of the aluminum test pieces, gel also generated in the coolant after corrosion test by applying the JIS method.

In contrast with the coolants in Comparative Examples, the coolant compositions according to the present invention (Examples 1 to 8) comprise citric acid and/or salts thereof as an essential constituent, in addition to at least one corrosion inhibitor selected from the group consisting of amine type, borax type, aromatic barboxylic acid type, fatty acid type, and nitrite type corrosion inhibitors. As a result, the coolants according to the invention produce aluminum heat-transfer corrosion rates less than the requirement 1.0 $mg/cm^2$/week and also exhibit a satisfactory appearance of the surface state of the test pieces.

Further, there is no apparent change in color of the sample coolants after the corrosion test, indicating that the coolants of the invention exert a good corrosion-preventing effect on metallic parts for use in cooling mechanism of internal combustion engines, in particular on aluminum alloy parts for use in a heat-generating surface.

Thus, it is expected that the engine antifreeze coolant compositions of the present invention perform useful work for the progressive introduction of auto aluminum parts, and for the resulting fuel economy.

What is claimed is:

1. In a glycol engine antifreeze coolant composition, the improvement which comprises the composition containing at least one corrosion inhibitor other than silicate and containing about 0.005 to about 0.5% by weight of at least one member of the group consisting of citric acid and citric acid salt.

2. An antifreeze coolant composition as claimed in claim 1 wherein the glycol is ethylene glycol or propylene glycol.

3. An antifreeze coolant composition as claimed in claim 2, wherein said member of the group is selected from citric acid, sodium citrate and ammonium citrate.

4. An antifreeze coolant composition as claimed in claim 1, wherein said corrosion inhibitor is at least one selected from the group consisting of phosphates, amine salts, borates, nitrates, nitrites, molybdates, tungstates, benzoates, triazoles, thiazoles, and fatty acid salts.

* * * * *